(12) United States Patent
Yamazaki et al.

(10) Patent No.: US 7,745,756 B2
(45) Date of Patent: Jun. 29, 2010

(54) LASER PROCESSING MACHINE

(75) Inventors: Tsunehiko Yamazaki, Aichi pref. (JP);
Naoomi Miyakawa, Aichi pref. (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 1053 days.

(21) Appl. No.: 11/420,260

(22) Filed: May 25, 2006

(65) Prior Publication Data

US 2007/0000888 A1    Jan. 4, 2007

(51) Int. Cl.
*B23K 26/14*   (2006.01)
*B23K 26/08*   (2006.01)
*B25F 3/00*    (2006.01)

(52) U.S. Cl. .............................. 219/121.6; 219/121.84; 29/50; 29/560

(58) Field of Classification Search ................................
219/121.63–121.72, 121.82, 121.84, 121.86;
29/560, 50; 82/138; 409/235; 483/16, 17
See application file for complete search history.

(56) References Cited

U.S. PATENT DOCUMENTS

| | | | | |
|---|---|---|---|---|
| 4,628,441 A | * | 12/1986 | Johnstone et al. | 700/193 |
| 4,698,480 A | * | 10/1987 | Klingel | 219/121.67 |
| 4,951,376 A | * | 8/1990 | Grund | 483/14 |
| 4,988,244 A | * | 1/1991 | Sheldon et al. | 409/132 |
| 5,439,431 A | * | 8/1995 | Hessbruggen et al. | 483/14 |
| 5,927,910 A | * | 7/1999 | Fix, Jr. | 408/17 |
| 6,393,687 B1 | * | 5/2002 | Friedrich | 29/560 |
| 6,528,762 B2 | * | 3/2003 | Mayer | 219/121.83 |
| 6,675,549 B1 | * | 1/2004 | Kaneda et al. | 52/749.1 |
| 6,949,056 B2 | * | 9/2005 | Soroka et al. | 483/14 |
| 7,665,200 B1 | * | 2/2010 | Shimooka | 29/560 |

2006/0153668 A1    7/2006   Weick et al.

FOREIGN PATENT DOCUMENTS

| | | |
|---|---|---|
| EP | 1 602 441 | 12/2005 |
| EP | 1 652 614 | 5/2006 |
| JP | 1-153877 | 10/1989 |

(Continued)

OTHER PUBLICATIONS

European Search Report for corresponding Application No. EP 06405231 dated Nov. 3, 2006.

(Continued)

*Primary Examiner*—Samuel M Heinrich
(74) *Attorney, Agent, or Firm*—Renner, Otto, Boisselle & Sklar, LLP

(57) ABSTRACT

A laser processing machine is provided in which a machining tool is automatically exchanged with a laser processing tool to be mounted to a processing head thereof to perform machining operations such as tapping to works. A machining tool 70 which is exchangeably clamped to a mounting section 510 of a processing head 50 of a laser processing machine has a body 720 and a piston member 730 in the body 720, and the piston member 730 supports an air motor 740, a reducer 750, a tool chuck 760, and a tap 762. Air is sent to the air motor 740 from an air source 551*b* by switching a valve, and an assist gas for a normal or reverse rotation is sent from an assist gas source 554*b* to the upper portion of the piston member 730, so that a tap is lowered to perform tapping to a work.

9 Claims, 23 Drawing Sheets

FOREIGN PATENT DOCUMENTS

| | | |
|---|---|---|
| JP | 04-197590 | 7/1992 |
| JP | 04-201142 | 7/1992 |
| JP | 04-289038 | 10/1992 |
| JP | 05-005282 | 1/1993 |
| JP | 05-057549 | 3/1993 |
| JP | 05-104365 | 4/1993 |
| JP | 06-039637 | 2/1994 |
| JP | 06-304755 | 11/1994 |
| JP | 07 328879 | 12/1995 |
| JP | 08132265 A * | 5/1996 |
| JP | 08-141857 | 6/1996 |
| JP | 11-090660 | 4/1999 |
| JP | 2000-033490 | 2/2000 |
| JP | 2003 320471 | 11/2003 |
| JP | 2006 102812 | 4/2006 |

OTHER PUBLICATIONS

Japanese Office Action for corresponding application No. JP2004-344170 dated Nov. 17, 2009.

* cited by examiner (a)            (b)

LASER PROCESSING MACHINE

The present application is based on Japanese patent application No. 2004-344170 filed on Nov. 29, 2004, the entire contents of which are hereby incorporated by reference.

BACKGROUND OF THE INVENTION

1. Field of the Invention

The present invention relates to a laser processing machine having a processing head to which a laser processing tool and a machining tool can be exchangeably mounted.

2. Description of the Related Art

Japanese Patent Open-Laid No. 4-201142 Publication (Patent Document 1) and Japanese Patent Open-Laid No. 5-57549 Publication (Patent Document 2) disclose a laser processing machine which has a separate machining tool for punching, tapping, drilling and the like in addition to a laser processing head. Japanese Patent Open-Laid No. 6-304755 Publication (Patent Document 3) discloses device for exchanging torches.

One object of the present invention is to provide a laser processing machine having a processing head to which a laser processing tool and a machining tool for reamering, drilling, hairlining, grinding and the like can be automatically and exchangeably mounted.

SUMMARY OF THE INVENTION

In order to achieve the above object, a laser processing machine according to the present invention basically comprises: a bed; a pellet disposed on the bed to support a work; a column which is controlled to move along the X axis, the X axis being the longitudinal axis of the bed; a saddle which is supported by the column and is controlled to move along the Y axis, the Y axis being perpendicularly crossing the X axis; a processing head which is supported by the saddle and is controlled to move along the Z axis, the Z axis being perpendicular to a plane defined by the X axis and the Y axis; a processing tool which is exchangeably mounted to the processing head; and a tool change magazine for a laser processing tool and a machining tool disposed at an automatic tool change position outside of a processing area. The processing head comprises: a clamping device to which a laser processing tool and a machining tool is exchangeably mounted; and a circuit in which feed air and assist gas is sent to the laser processing tool and the machining tool, and the laser processing tool comprises: a body; a rod member which is slidably mounted into the body and has a condenser lens; and a clamping device to fix the rod member to the body. The machining tool comprises: a body; a piston member which is slidably mounted in the body; an air motor supported by the piston member; a tool chuck which is driven by the air motor; and a tool which is mounted to the tool chuck for drilling, reamering, tapping, hairlining or grinding. The machining tool further comprises a processing tool for the walls of openings formed by laser processing or a processing tool for roughing work surfaces.

As described above, a laser processing machine according to the present invention can perform machining operations such as drilling, reamering, tapping, hairlining, or grinding in addition to laser processing, because the laser processing machine has a processing head to which a laser processing tool and a machining tool are automatically and exchangeably mounted.

DETAILED DESCRIPTION OF THE PREFERRED EMBODIMENTS

Figure 1:
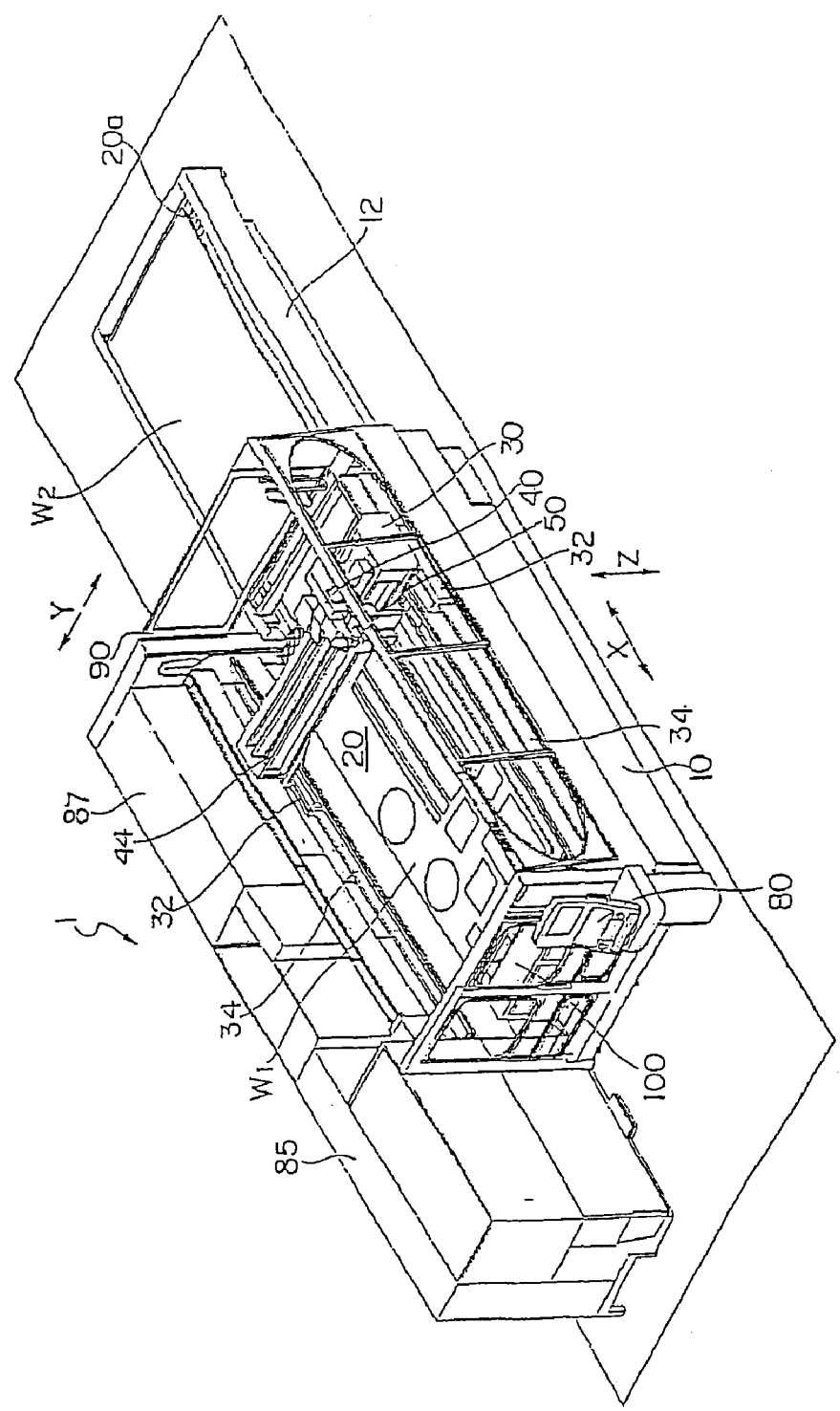
FIG. 1 is a perspective view to show the entire of a laser processing machine according to the present invention.
Figure 2:
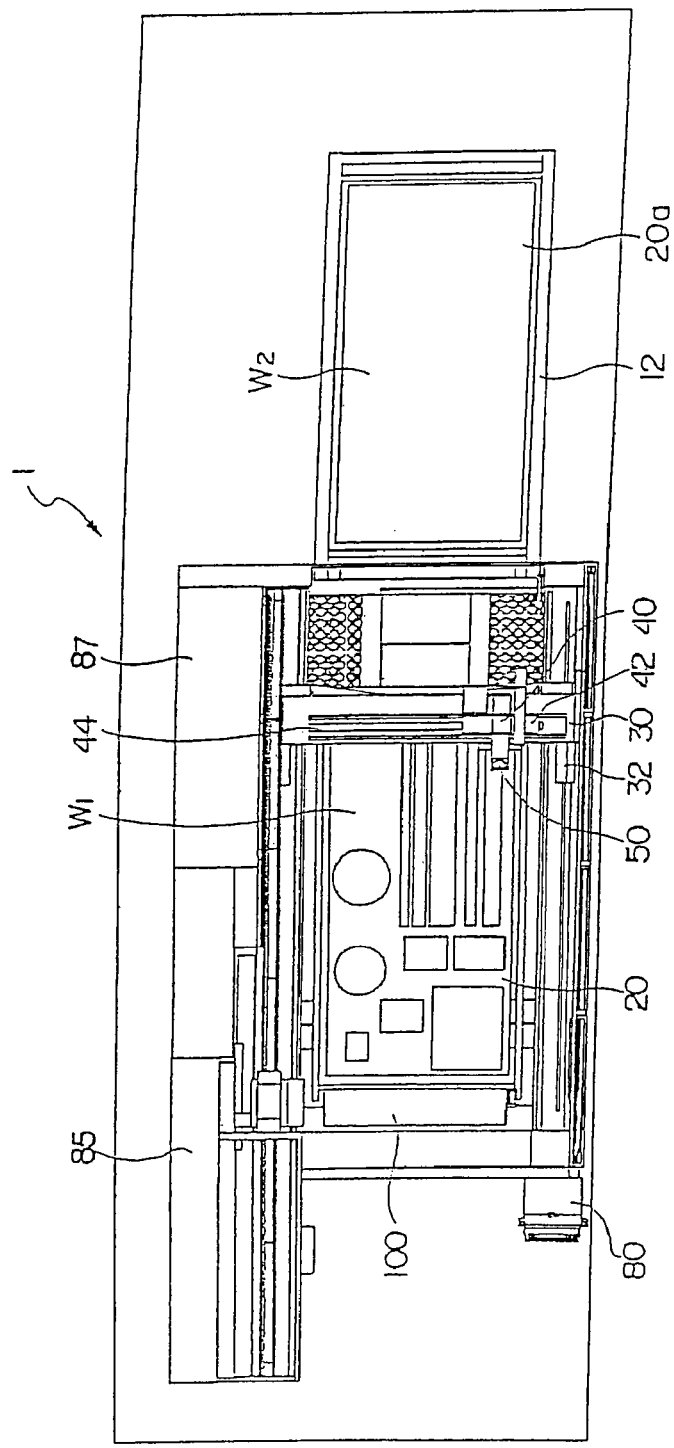
FIG. 2 is a plan view to show a laser processing machine according to the present invention.
Figure 3:
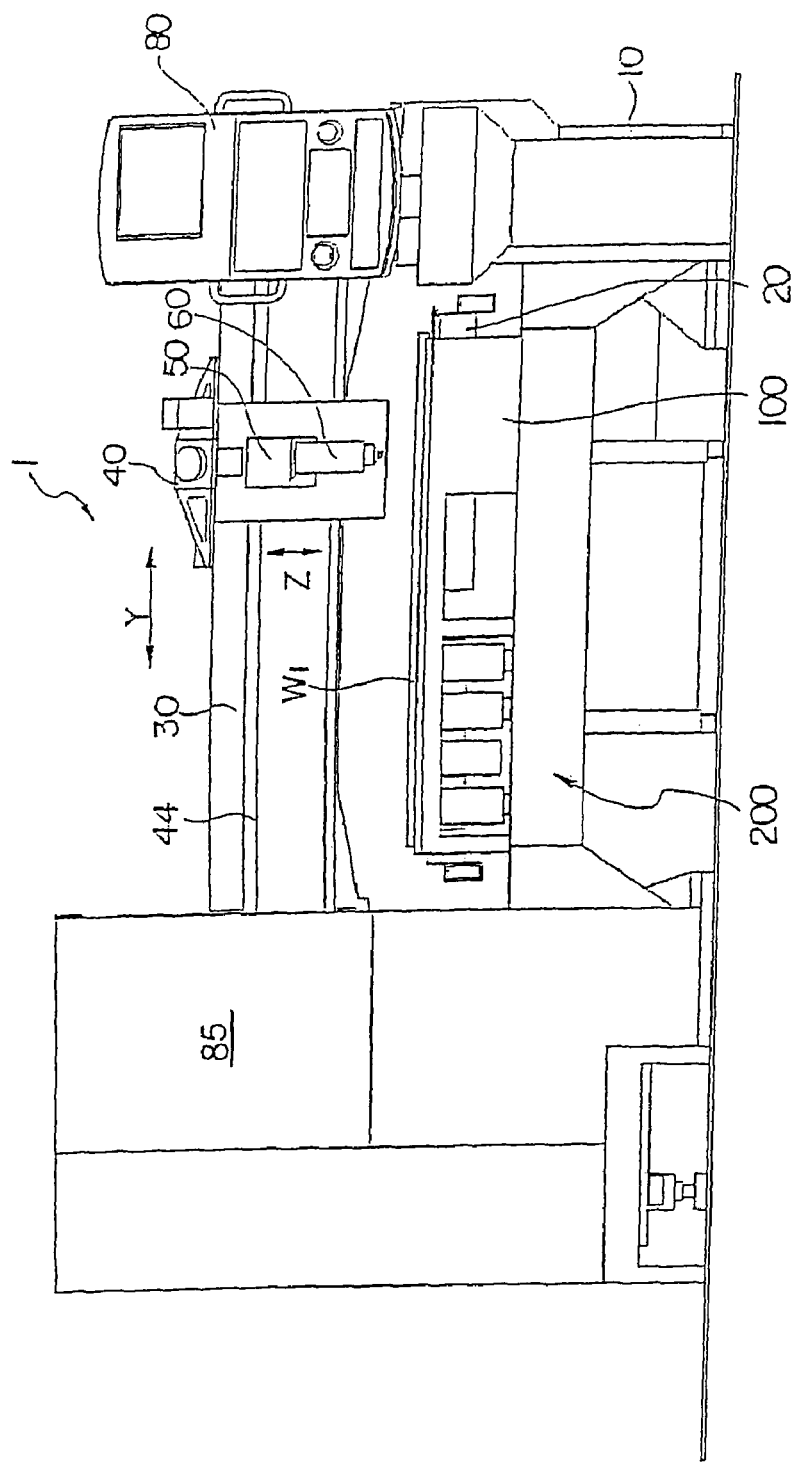
FIG. 3 is an elevational view to show some main parts of a laser processing machine according to the present invention.
Figure 4:
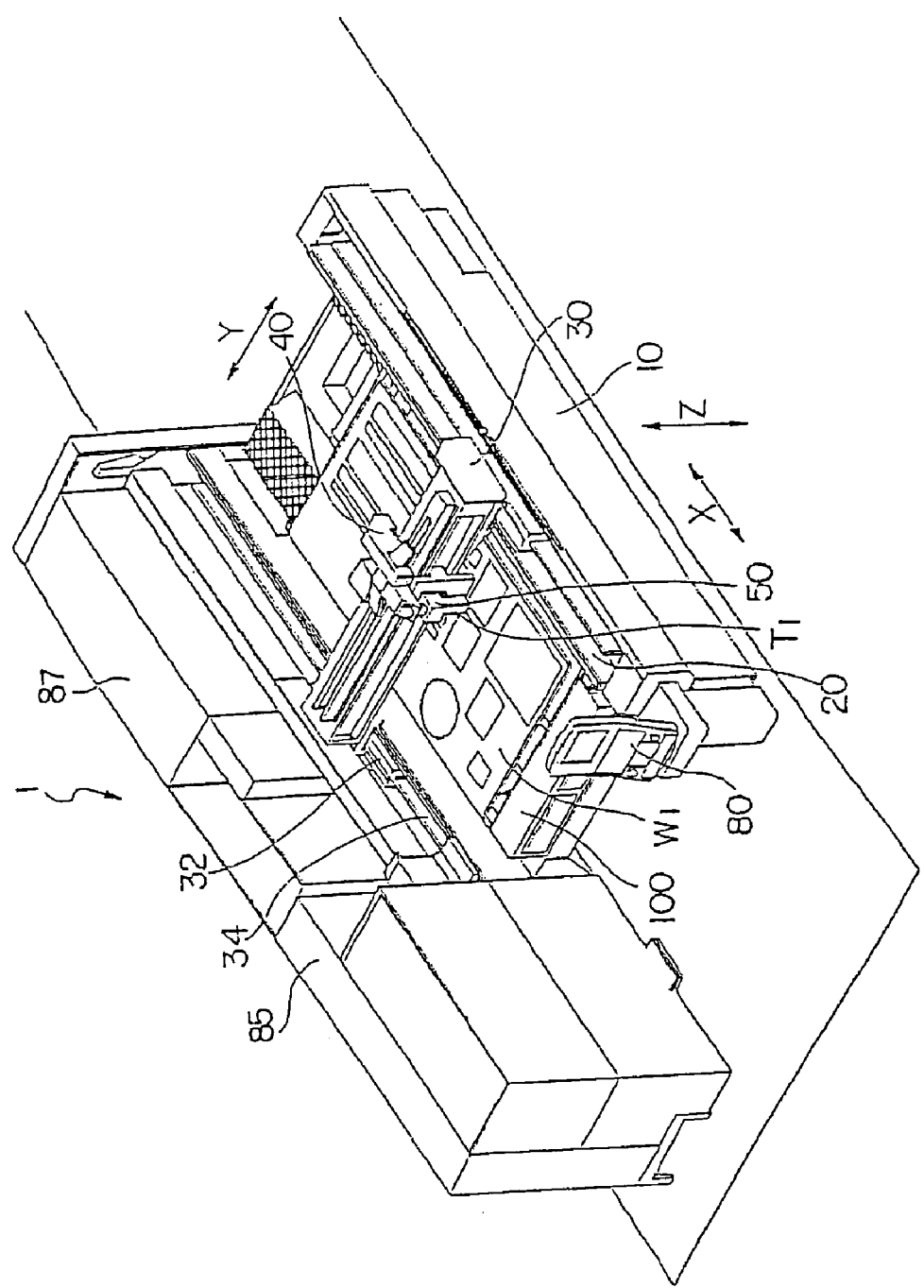
FIG. 4 is a perspective view to show some main parts of a laser processing machine according to the present invention.
Figure 5:
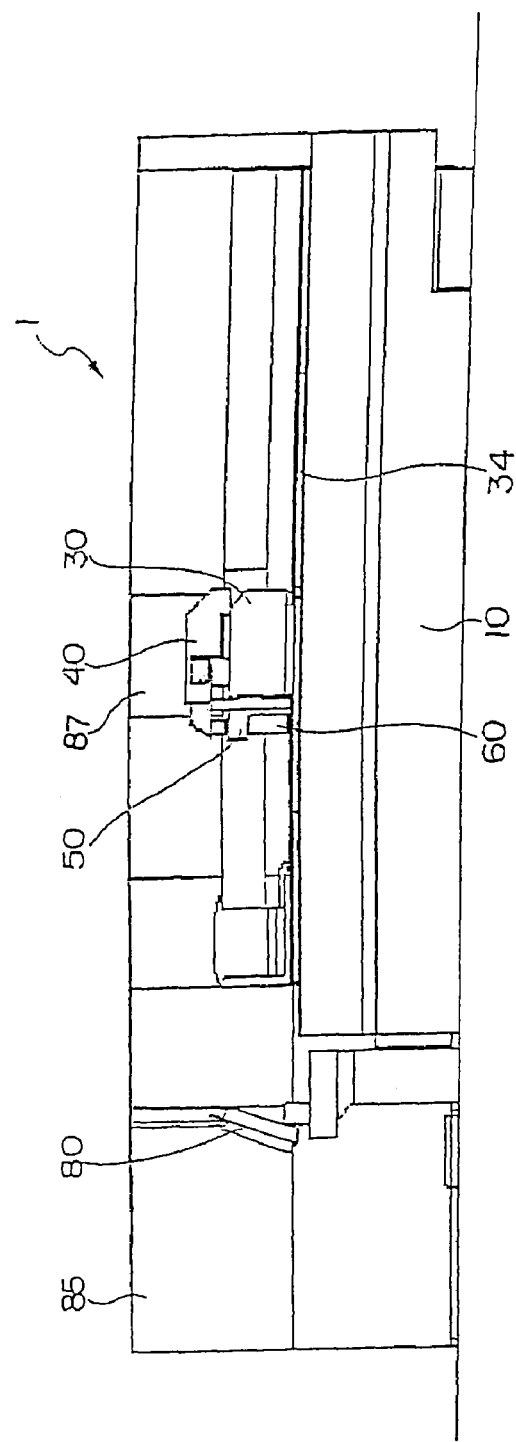
FIG. 5 is a side view to show some main parts of a laser processing machine according to the present invention.

FIG. 1 is a perspective view to generally show a laser processing machine according to the present invention. FIG. 2 is a plan view of the same, FIG. 3 is an elevational view of the same, FIG. 4 is a perspective view to show main parts of the same, and FIG. 5 is a side view to show main parts of the same. A laser processing machine, which is denoted by reference numeral 1, has a bed and a pallet (table) 20 disposed on the bed, and a sheet of a work $W_1$ is rested on the pellet 20. A pallet exchanging device 12 is arranged adjacent to the bed 10 in the longitudinal direction of the bed 10, having a pallet 20$a$ on which a work $W_2$ is rested for a subsequent processing.

A pair of guide rails 34 are provided along both of the longitudinal sides of the bed 10, and a column 30 is mounted on the guide rails 34 to be movable in the X axis direction.

The column 30 may move in the X axis direction driven by for example a linear motor which is formed between a stator provided to the guide rails 34 and movers provided to translation guides 32.

The column 30 includes a guide rail 44 provided along the Y axis which is perpendicularly crossing the X axis to mount a saddle 40 movable in the Y axis direction. The saddle 40 includes a translation guide 42 which engages with the guide rail 44, which forms a linear motor between the guide rail 44 and the translation guide 42.

The saddle 40 includes a guide rail in the Z axis direction which is perpendicular to a plane defined by the X axis and the Y axis, and a processing head 50 is mounted to the guide rail movable along the Z axis. The processing head 50 includes an optical system into which a laser beam is introduced from a laser emitting device 87.

To the processing head 50, a laser processing tool or a machining tool is exchangeably mounted which is shown by reference numeral $T_1$ in FIG. 4. A processing area is covered with a cover 90 for safety. An electric cabinet 85 and the laser emitting device 87 are arranged adjacent to the bed 10. A control panel 80 through which an operator issues commands for various operations is disposed at one end of a longitudinal side of the bed 10. At one end of the bed 10 which is close to the control panel 80, a setup station 100 for a laser processing tool is provided.

Figure 6:
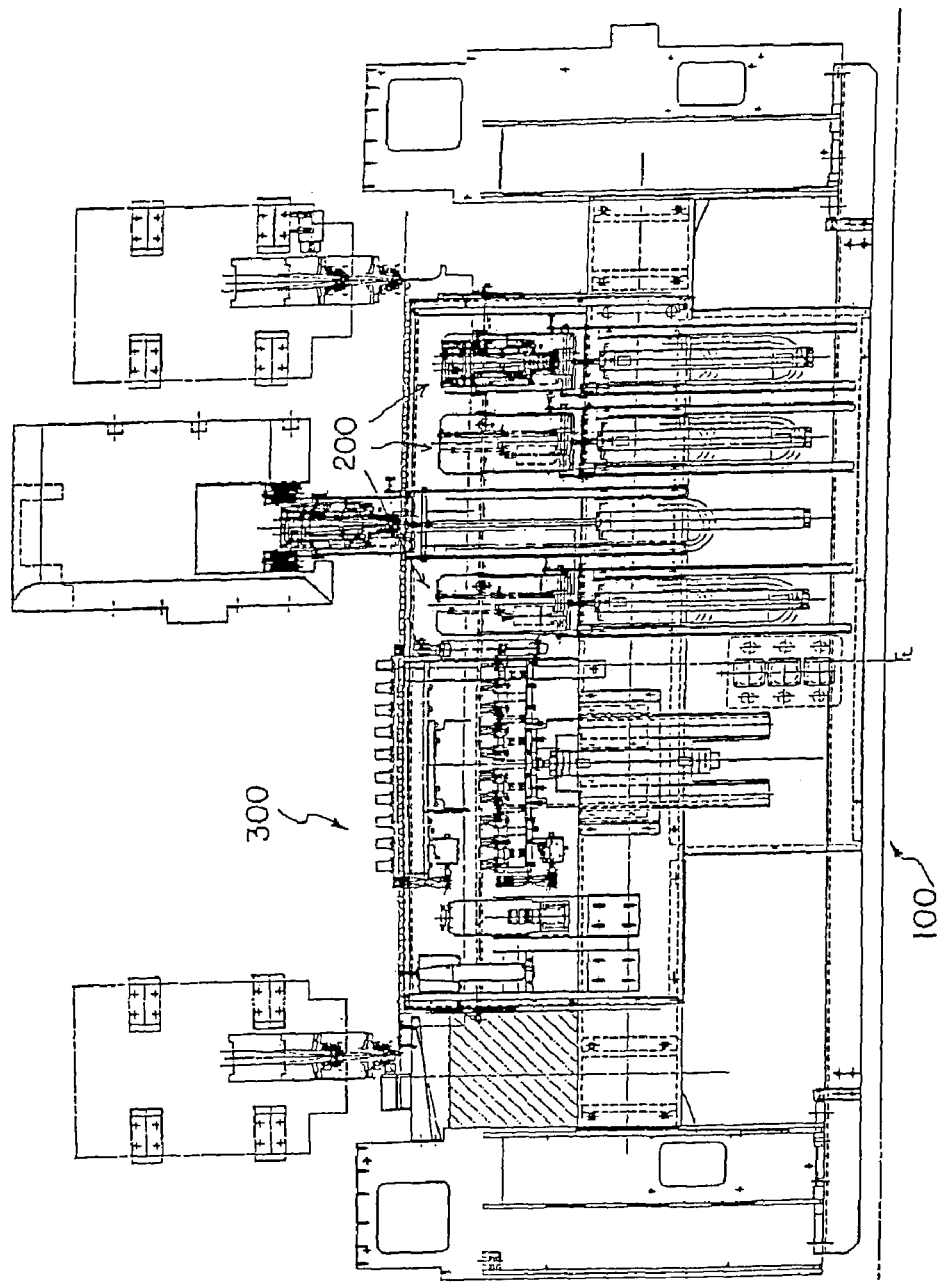
FIG. 6 is an elevational view to show a setup station of a laser processing tool.
Figure 7:
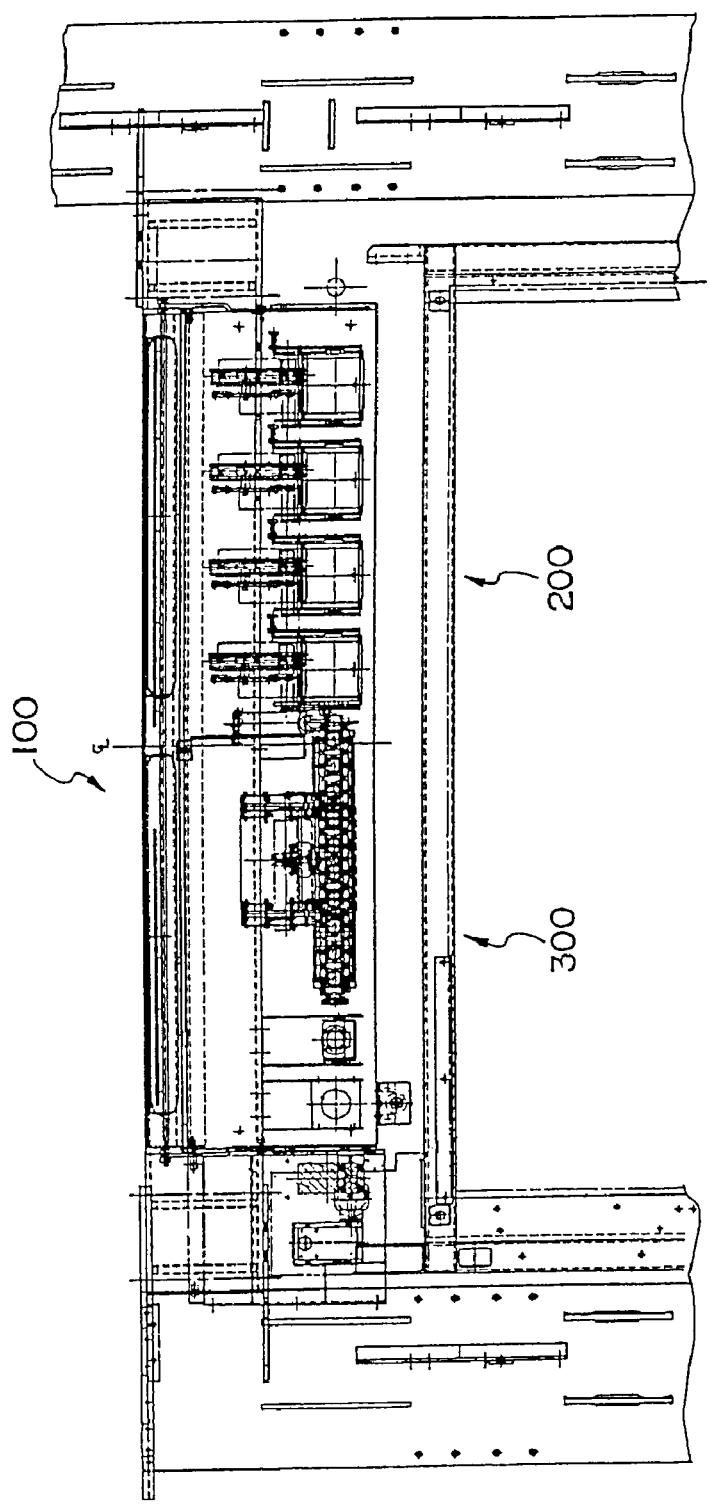
FIG. 7 is a plan view to show a setup station of a laser processing tool.

FIG. 6 is an elevational view to show the setup station 100 for a laser processing tool as seen from the table, and FIG. 7 is a plan view to show the same. The setup station 100 for a laser processing tool includes: a tool station 200 equipped with a tool change magazine for laser processing tools having a torch and a nozzle respectively and machining tools; and a nozzle station 300 equipped with a nozzle change magazine for nozzles of the laser processing tools.

Figure 8:
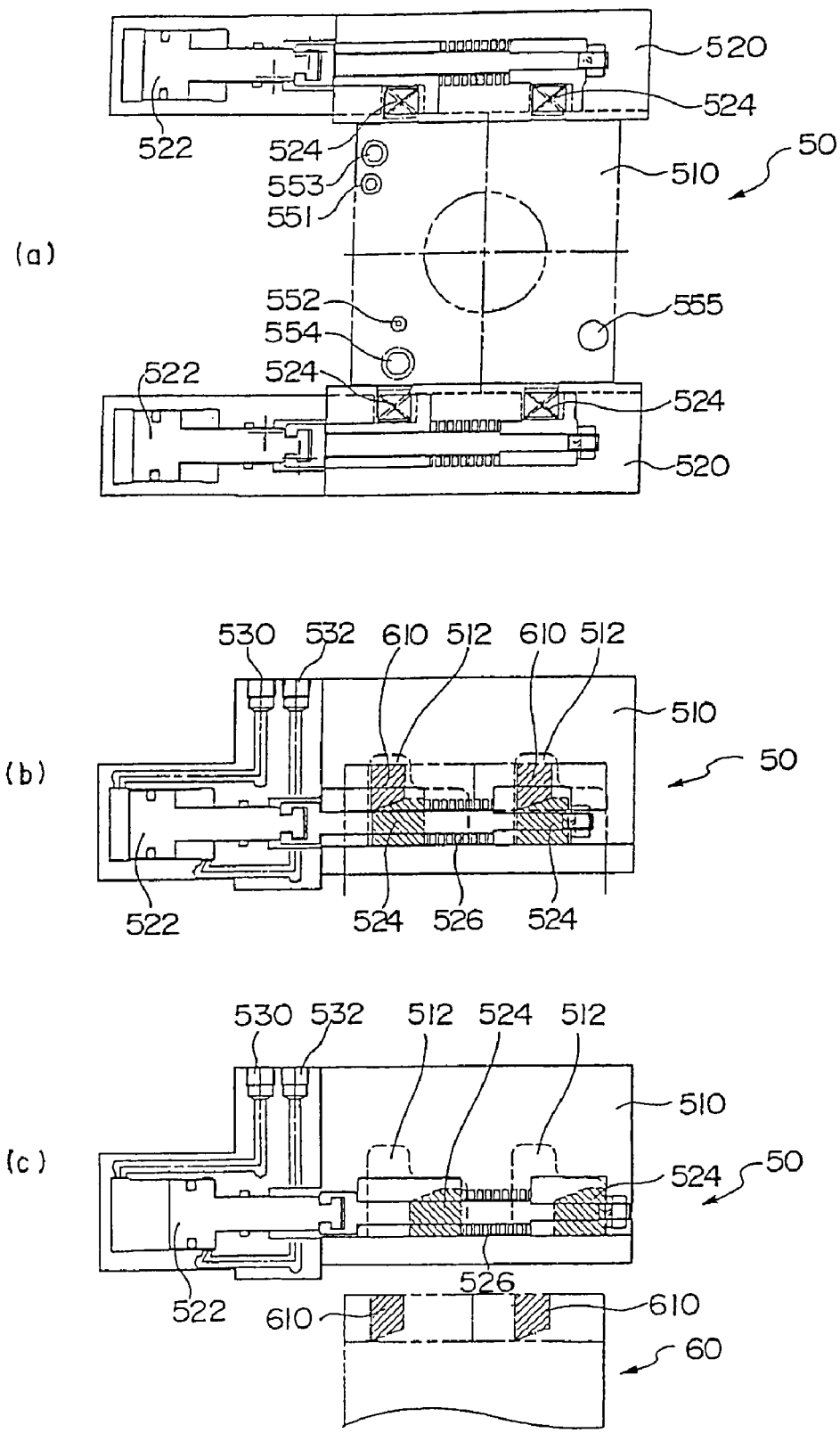
FIG. 8A is a view to illustrate the configuration of a lower end portion of a processing head 50.
FIG. 8B is a view to illustrate the configuration of a lower end portion of a processing head 50.
FIG. 8C is a view to illustrate the configuration of a lower end portion of a processing head 50.

FIGS. 8A-8C are the views to illustrate the configuration of a lower end portion of the processing head 50. The processing head 50 has a mounting section 510 at the lower end portion thereof to which a processing tool is exchangeably mounted. To both sides of the mounting section 510, a pair of clamping devices 520 are arranged. Each clamping device 520 has a piston 522 and wedge shaped pawls 524 which are operated by the piston 522.

FIG. 8A shows pawls 610 at the top of the laser processing tool 60, and the pawls 610 are controlled to be engaged or disengaged with cavities 512 in the mounting section 510 of the processing head 50 in the perpendicular direction. The piston 522 is in communication with an air flow path 530 on the side for unclamping tools and an air flow path 532 on the side for clamping tools.

FIG. 8B shows a state in which a tool 60 is clamped by supplying air through the air flow path 532 on the side for clamping tools so that the wedge shaped pawls 524 are drawing in to engage the pawls 610 of the laser processing tool 60.

FIG. 8C shows a state in which a tool 60 is clamped by supplying air through the air flow path 530 on the side for unclamping tools so that the piston 522 is forced out to cause the wedge shaped pawls 524 to disengage the pawls 610 of the tool 60. A spring for balancing 526 is provided to press the two wedge shaped pawls 524 against the pawls 610 of the tool with an even force.

The mounting section 510 of the processing head 50 has a bottom surface where the openings of an air flow path 551 for clamping a rod member which has a condenser lens of a laser processing tool, an air flow path 552 for unclamping the same, an air flow path 553 for lowering the condenser lens, and an assist gas flow path 554 are arranged. A connector 555 to a sensor table is also arranged in the bottom surface.

The processing head 50 according to the present invention includes the plurality of air flow paths described above and an assist gas flow path, and has a laser processing lens which can be automatically focused as will be described below. The present invention utilizes this mechanism to exchangeably mount a machining tool to a processing head and drive a rotating tool by an air turbine. Thus, a mechanism similar to the pawl at the upper end portion of a laser processing tool is also provided to the upper end portion of a machining tool.

FIGS. 9 to 14 are the views to illustrate the operations for mounting a laser processing tool 60 to a processing head of a laser processing machine.

Figure 9:
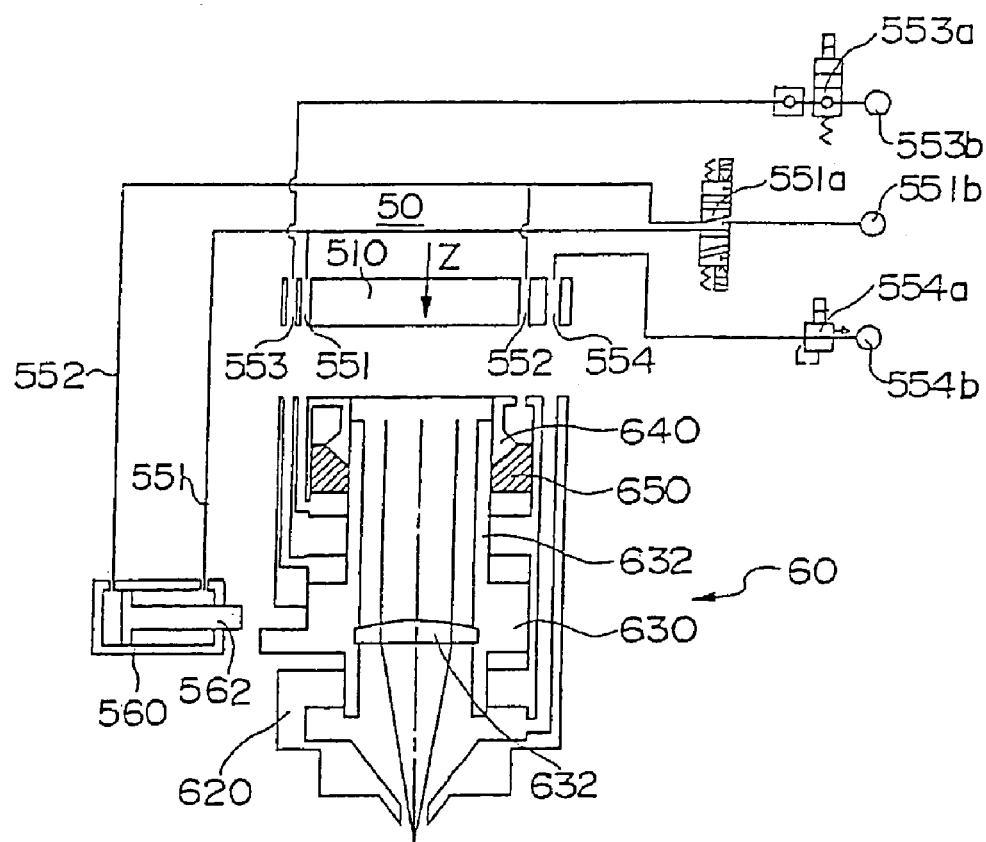
FIG. 9 is a view to illustrate an operation when a laser processing tool 60 is mounted to a processing head of a laser processing machine.

In FIG. 9, a laser processing tool 60 includes a tool body 620 and a rod 630 which is mounted in the body 620 movable in the vertical direction, and a condenser lens 632 is provided in the rod 630. The rod 630 includes a cylinder section 632, and a piston 650 is arranged around the outer circumferential surface of cylinder section 632. When the piston 650 abuts on a wedge 640 on the side toward the rod 630, the rod 630 is clamped, and when the piston 650 is separated from the wedge 640, the rod 630 is unclamped. A stopper cylinder 560 provided on the side toward a processing head includes a piston 562 which extends and retracts relative to the cylinder 560. FIG. 9 shows an operation for attaching a laser processing tool 60 to a mounting section 510 of a processing head 50 by lowering the processing head 50 in the Z axis direction.

Figure 10:
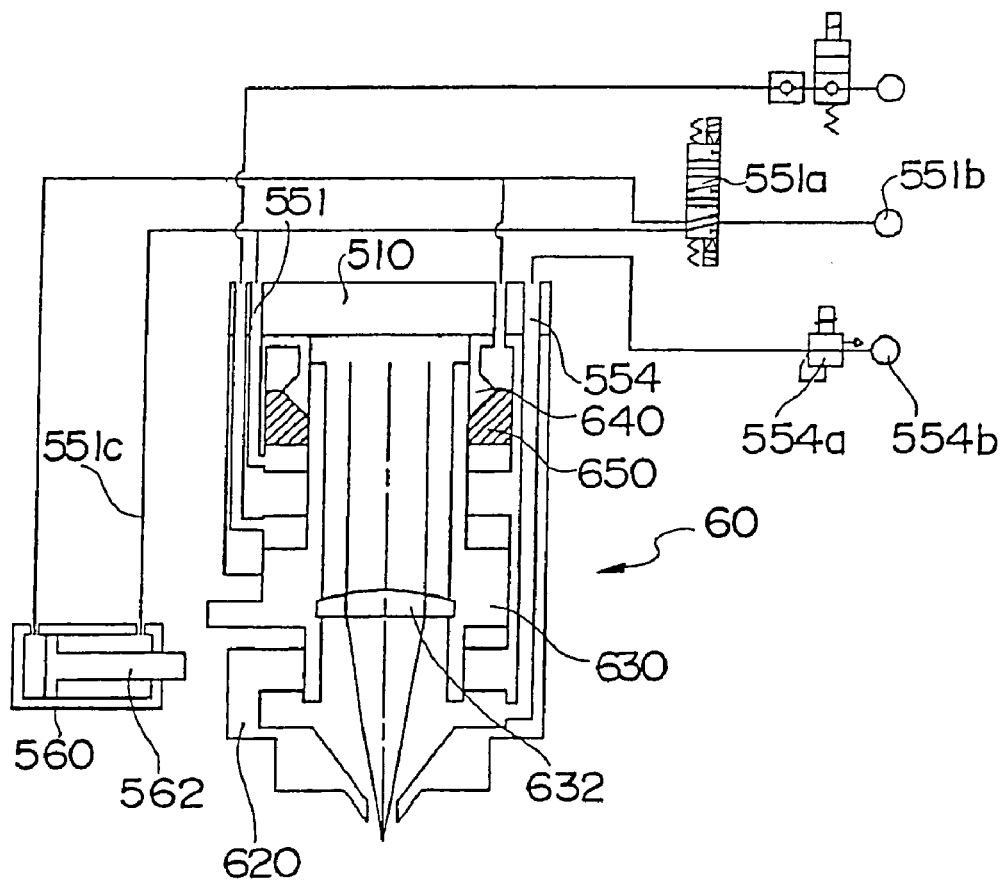
FIG. 10 is a view to illustrate an operation when a laser processing tool 60 is mounted to a processing head of a laser processing machine.

FIG. 10 shows a state in which air is supplied through a switching valve 551$a$ from an air source 551$b$ to an air flow path for clamping 551. When the air pushes up the pistons 650 in the laser processing tool 60, the pistons 650 abuts on the wedges 640 by pressure, which clamps the rod 630. This clamping air is also diverged to be sent into a line 551$c$ for a stopper cylinder 560 to retract a stopper piston 562. In this state, the laser processing tool 60 is able to perform a normal laser processing. Here, an assist gas is supplied from an assist gas source 554$b$ through an NC controlled electropneumatic regulator 554$a$ and an assist gas flow path 554 to the laser processing tool 60.

Next, referring to FIGS. 11 to 13, operations for automatic focusing of a laser processing tool will be explained.

Figure 11:
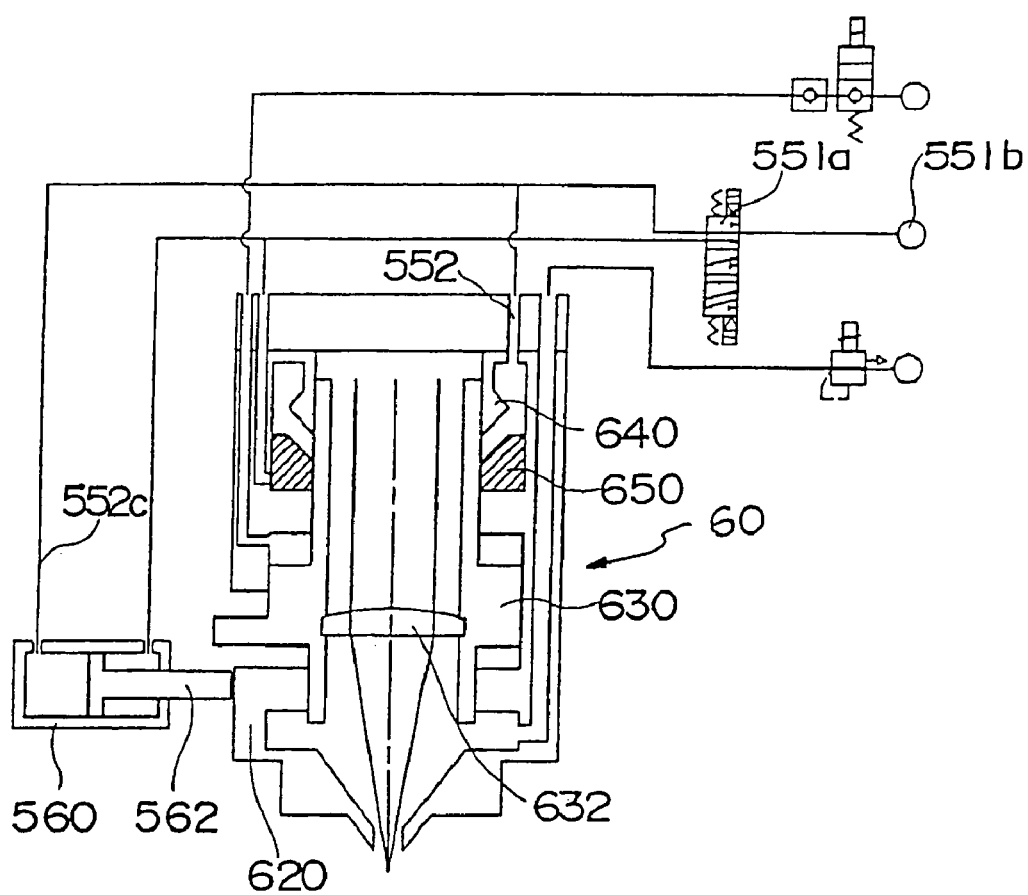
FIG. 11 is a view to illustrate an operation when a laser processing tool 60 is mounted to a processing head of a laser processing machine.

FIG. 11 shows a state in which air is supplied through the switching valve 551$a$ from the air source 551$b$ to an air flow path for unclamping 552. The piston 650 is pushed down by the air and is separated from the wedge 640 to unclamp the rod 630 relative to the body 620. The air is sent to the stopper cylinder 560 through a line 552c. The stopper piston 562 is pushed out by the air.

Figure 12:
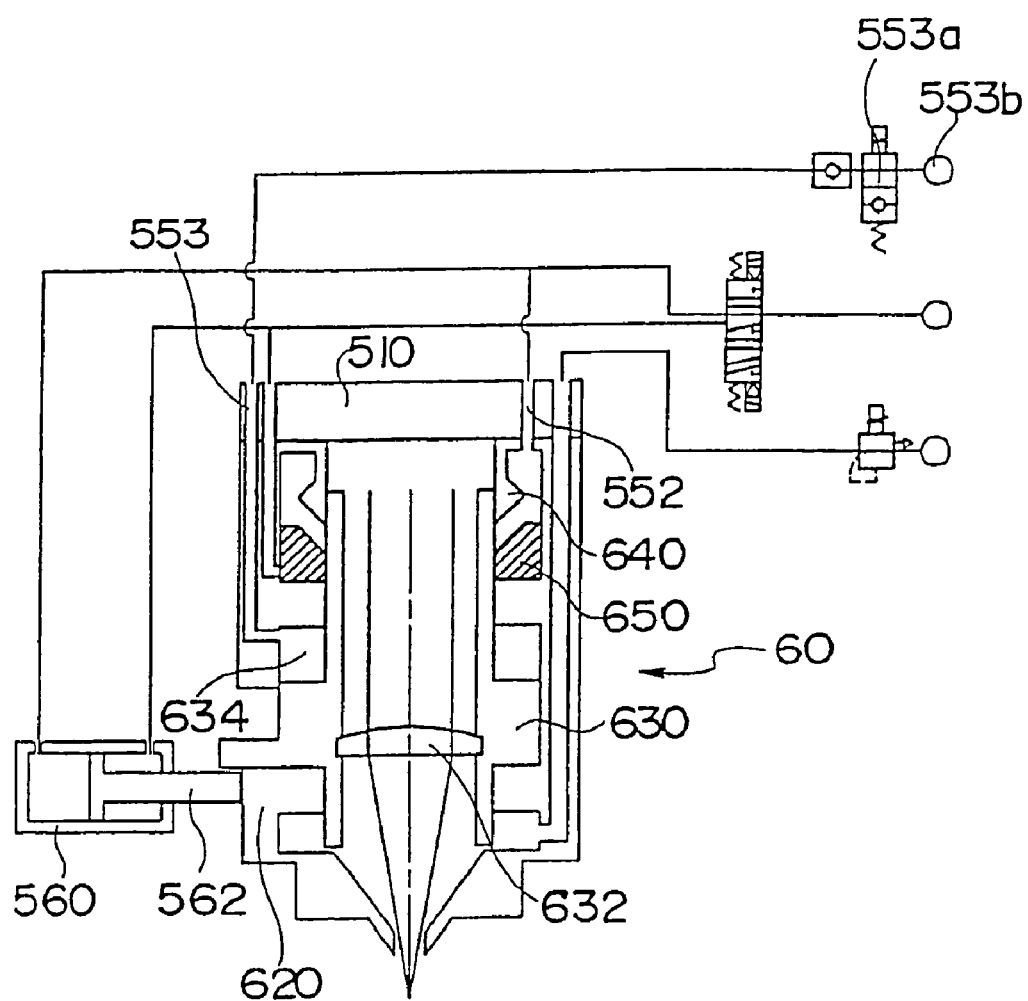
FIG. 12 is a view to illustrate an operation when a laser processing tool 60 is mounted to a processing head of a laser processing machine.

In the next operation, as shown in FIG. 12, the air is sent through an air check valve 553a of an air source 553b into an air flow path for lowering a lens 553. This air flows into a chamber 634 between the body 620 and the rod 630 to lower the rod 630 and the lens 632 along the Z axis to the lowest point.

Figure 13:
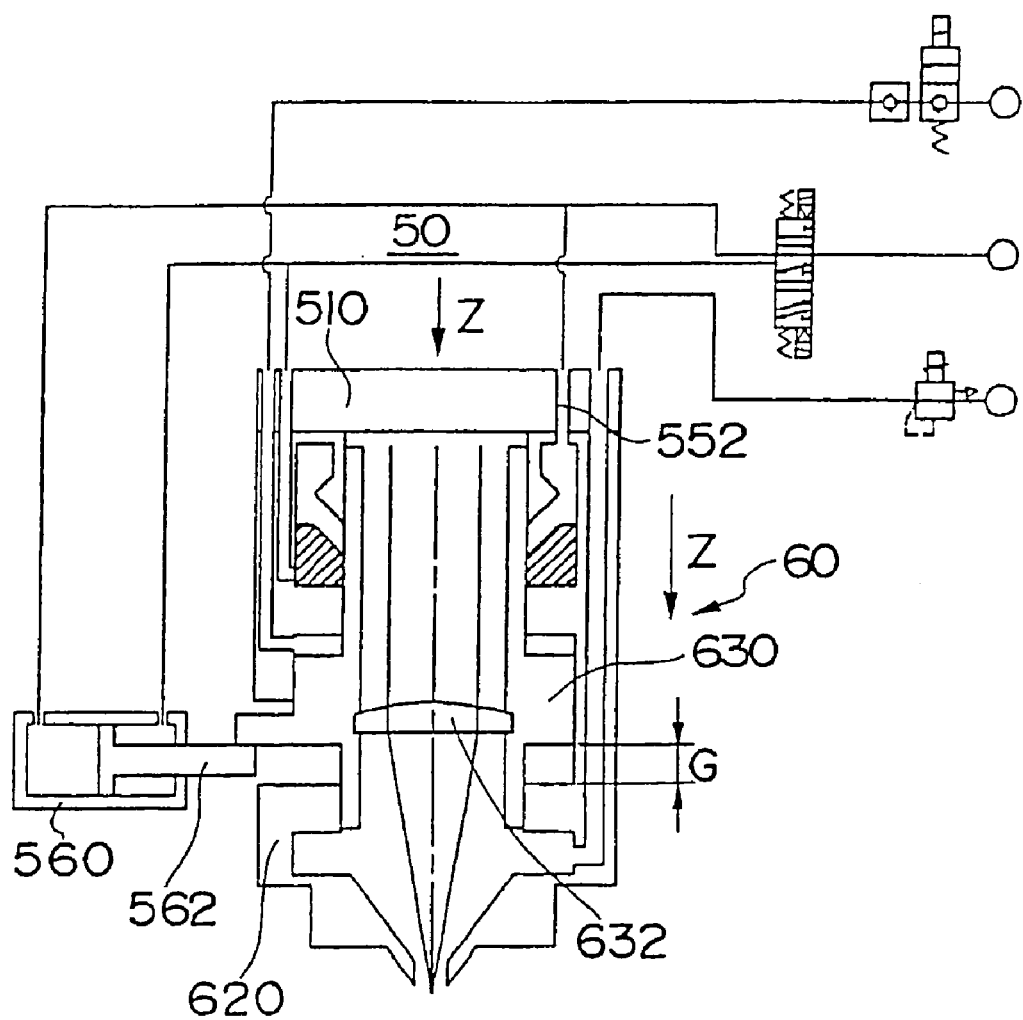
FIG. 13 is a view to illustrate an operation when a laser processing tool 60 is mounted to a processing head of a laser processing machine.
Figure 14:
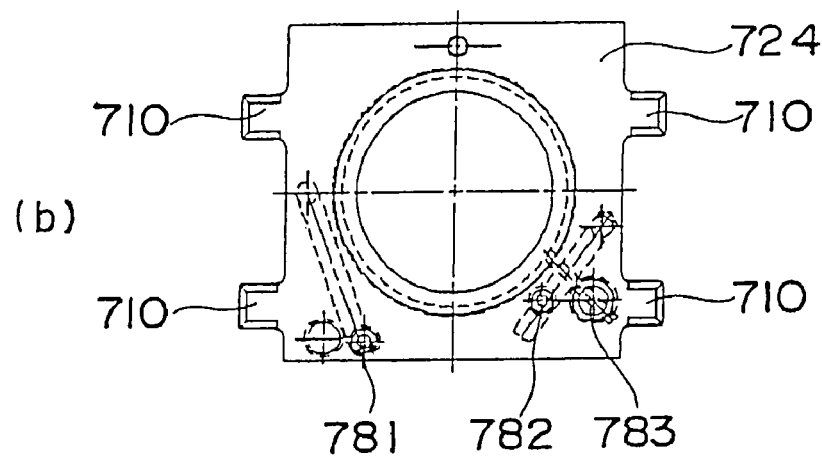
FIG. 14A is a view to illustrate the configuration of a machining tool used in the present invention.
FIG. 14B is a view to illustrate the configuration of a machining tool used in the present invention.
Figure 14:
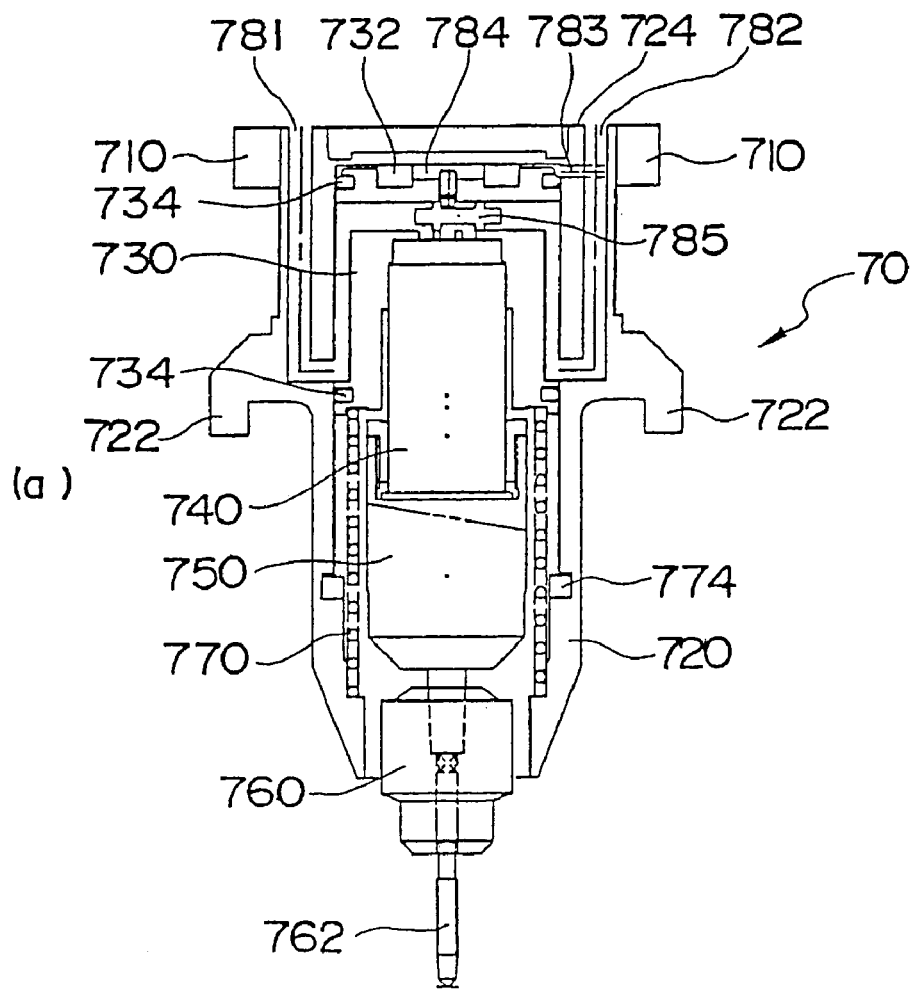

In FIG. 13, the processing head 50 is lowered to an optional coordinate position along the Z axis in corresponding to an NC command. This operation defines an adjustable focal length G relative to the lens 632 and the body 620. This achieves an automatic focus adjustment of the condenser lens 632.

Then, the operation returns to the state of FIG. 10, and in the state, the air is sent to the clamping circuit 551 to clamp the rod 630 to the body 620 and retract the stopper piston. Here, an assist gas is supplied to resume a laser processing.

FIGS. 14A-14B are the views to illustrate the configuration of a machining tool used in the present invention. A machining tool, which is generally shown by reference numeral 70, has a body 720 with hooks 722 on outside surfaces thereof along its center line. The hooks 722 are used to hang the machining tool 70 in a magazine. Four pawls 710 are provided with at the upper end of the body 720 which engage with clamping pawls of a tool change device for the processing head.

A piston member 730 is disposed in the body 720, and a pressurizing chamber 784 is formed between the piston member 730 and the upper surface 724 of the body 720. In the piston member 730, an air motor 740 is equipped with. The output of the air motor 740 is controlled to be reduced by a reducer 750, and drives a tool chuck 760. To the tool chuck 760, for example a tap 762 for threaded holes is chucked.

Piston seals 734 are attached to the top and bottom of the outer circumference of the piston member 730. To the top of the piston member 730, a dumper 732 is also provided. A spring 770 is further provided between the bottom of the piston member 730 and the body 720 to bias the piston member 730 upward. A dumper 774 at the lowest end position of the piston member 730 provides cushioning. A switching valve 785 is provided at the upper portion of the air motor 740 to switch between a normal rotation and a reverse rotation of the air circuit.

The upper surface 724 of the body 720 has an opening of an air flow path 781 for the normal rotation of the air motor which is in communication with an air flow path for clamping rod, and an opening of an air flow path 782 for the reverse rotation of the air motor which is in communication with an air flow path for unclamping rod in using a laser processing tool. A path to supply an assist gas is connected to the flow path 783 in the body 720 for the pressurizing chamber 784.

Figure 15:
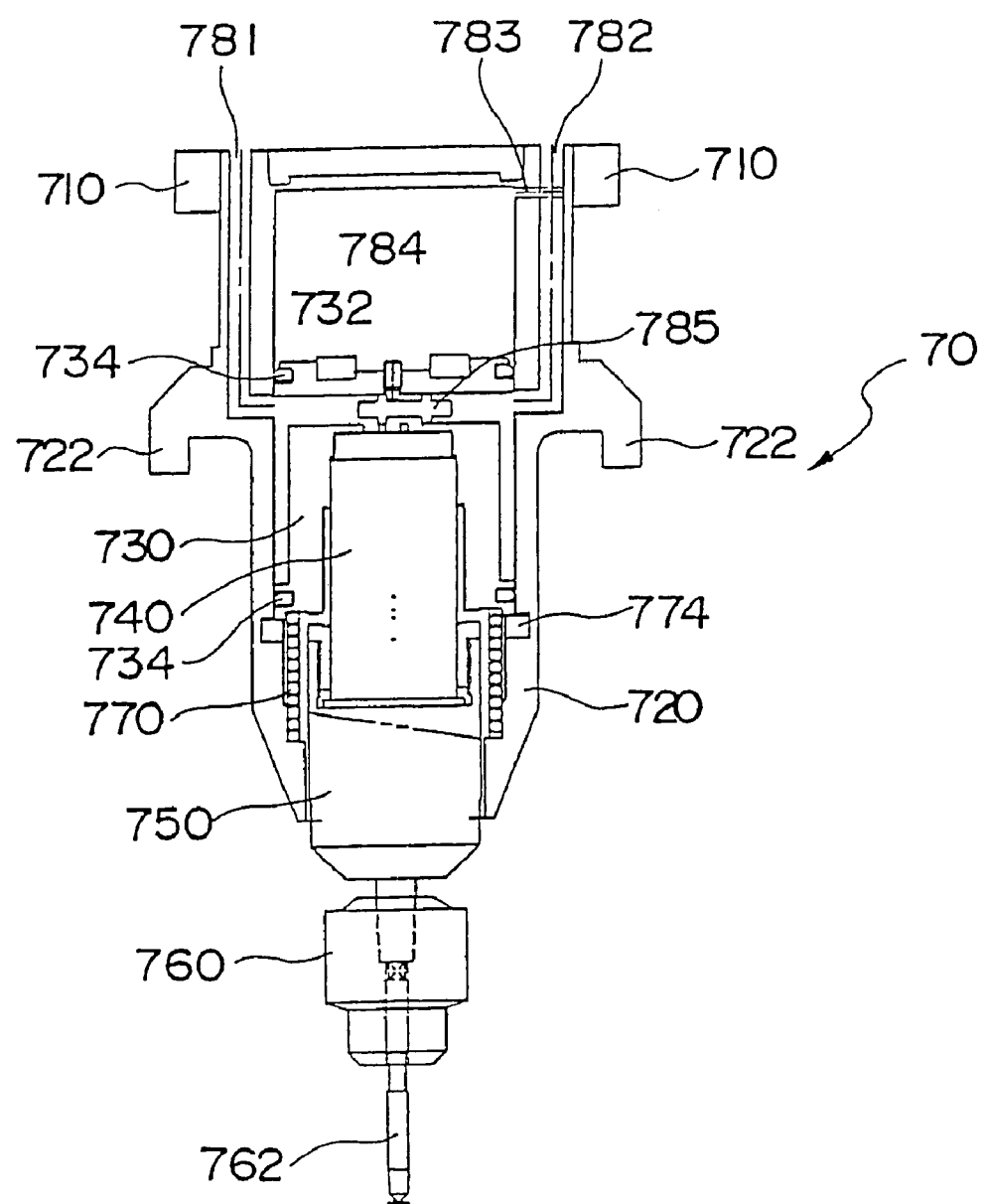
FIG. 15 is a view to illustrate the configuration of a machining tool used in the present invention.

FIG. 15 shows a state in which an assist gas having an adjusted pressure is sent into the pressurizing chamber 784 through the NC controlled electropneumatic regulator, and the gas causes the piston member 730 to be lowered against the spring 770. The tap 762 which is driven by the air motor 740 is projected out from the body 720 to perform a tapping operation to a work.

Now, referring to FIGS. 16-21, operations for machining with a machining tool 70 mounted to the processing head 50 will be explained.

Figure 16:
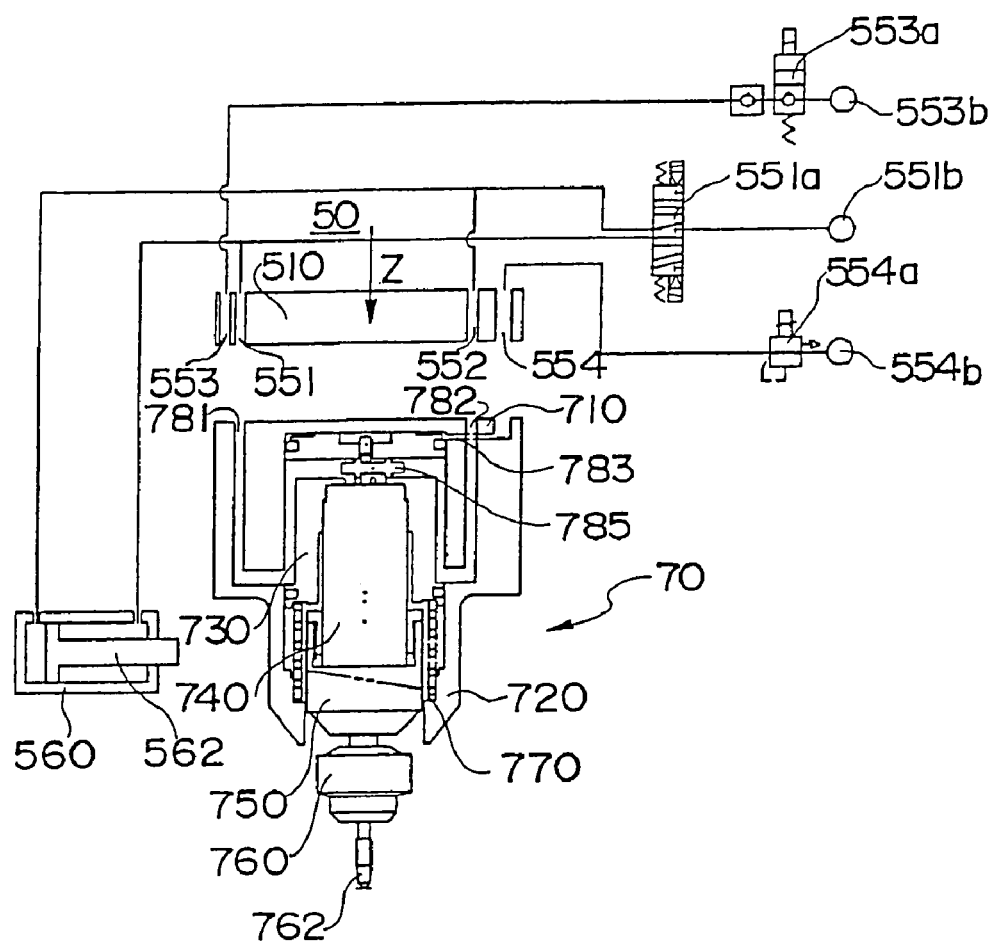
FIG. 16 is a view to illustrate a machining operation by a processing head 50 mounting a machining tool 70.

In FIG. 16, the processing head 50 has a configuration similar to that in the description for the laser processing tool, so similar numerals are used to explain similar parts, and the processing head 50 will not be described or illustrated in detailed below. The processing head 50 is lowered in the Z axis direction toward a machining tool 70 which is displaced at a tool change position, and clamps the machining tool 70.

Figure 17:
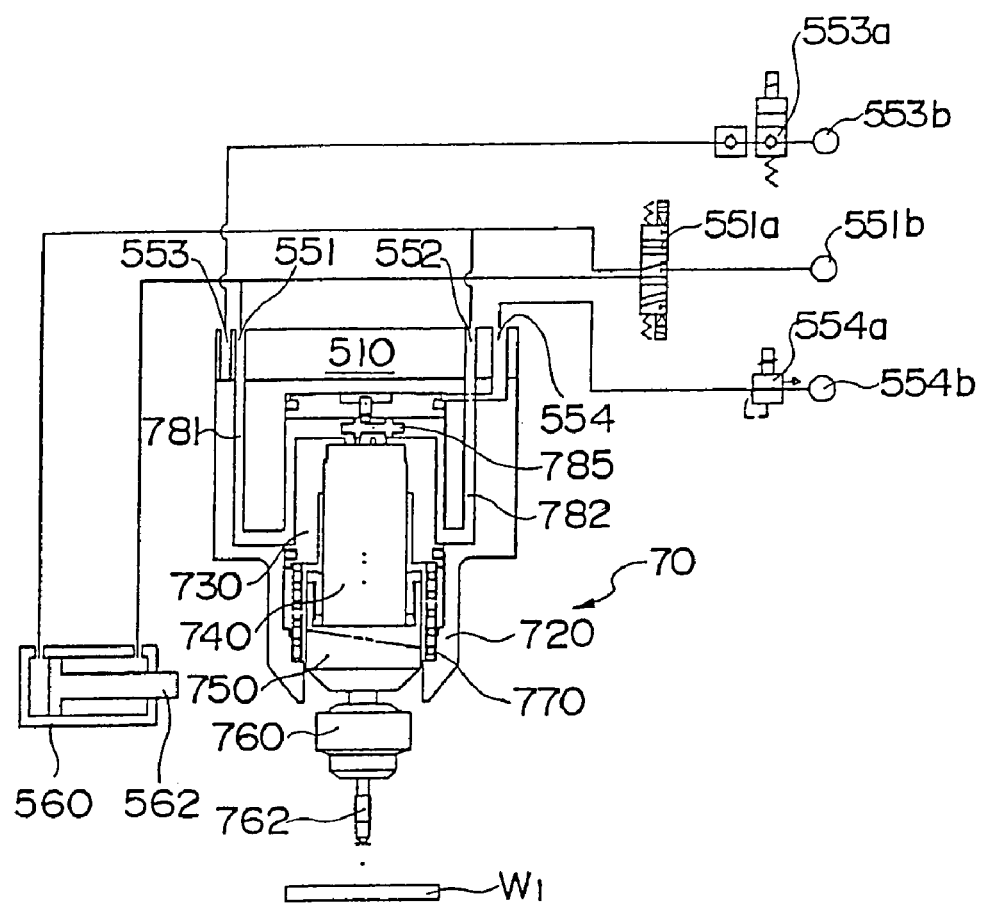
FIG. 17 is a view to illustrate a machining operation by a processing head 50 mounting a machining tool 70.

In FIG. 17, among the air flow paths in the mounting section 510 of the processing head, the circuit 551 for clamping the rod having a lens of a laser processing tool, and the circuit 552 for unclamping the same are used, and the circuit 553 for lowering the lens is not used. The assist gas flow path 554 is used to operate a cylinder member 730.

Figure 18:
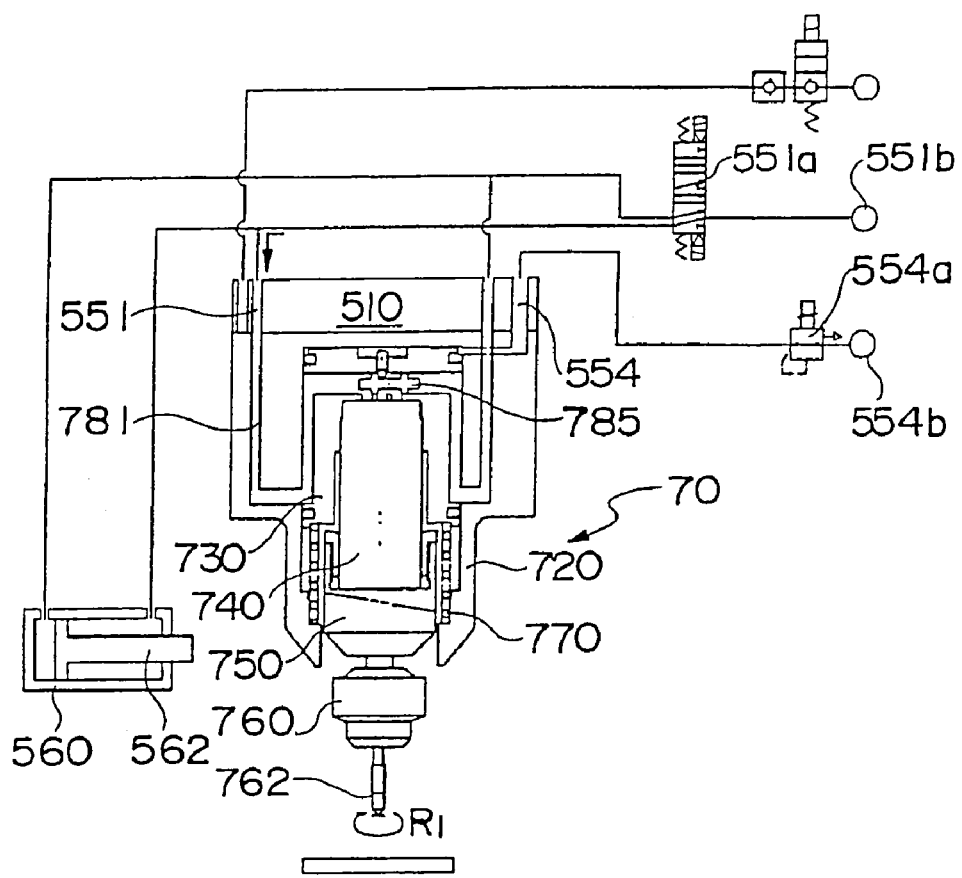
FIG. 18 is a view to illustrate a machining operation by a processing head 50 mounting a machining tool 70.

In FIG. 18, air is supplied from the air source 551b through the switching valve 551a to a circuit for clamping 551. The air through the circuit 781 of the machining tool 70 is sent into an air motor 740 and the reducer 750 by switching the switching valve 785 to rotate the tap 762 in a normal direction $R_1$.

Figure 19:
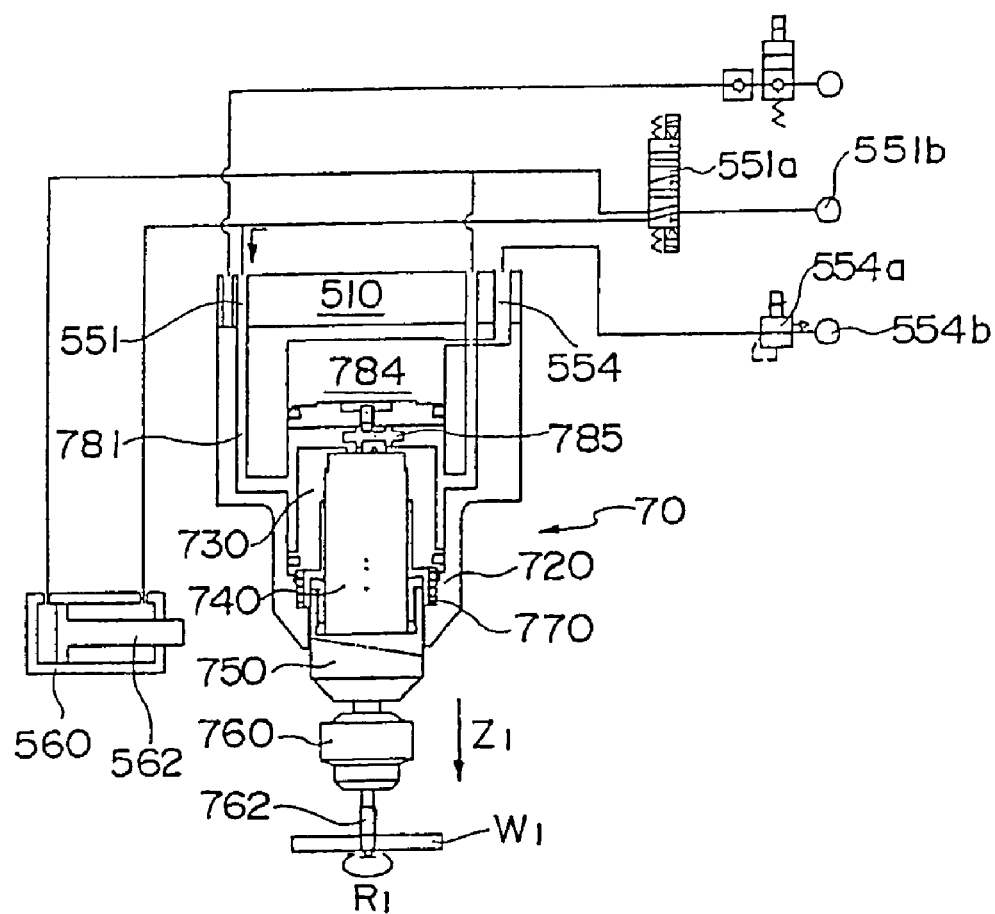
FIG. 19 is a view to illustrate a machining operation by a processing head 50 mounting a machining tool 70.

In this state, as shown in FIG. 19, an assist gas having an adjusted pressure is supplied from an assist gas source 554b through the NC controlled electropneumatic regulator 554a into an assist gas circuit 554. The assist gas is sent to the pressurizing chamber 784 to lower the cylinder member 730 against the spring 770. The tap 762 in a normal rotation contacts a work $W_1$ and starts a tapping operation. Once the tapping operation is started, the tap 762 is threaded into the work $W_1$ by its own operation for completion of the tapping.

Figure 20:
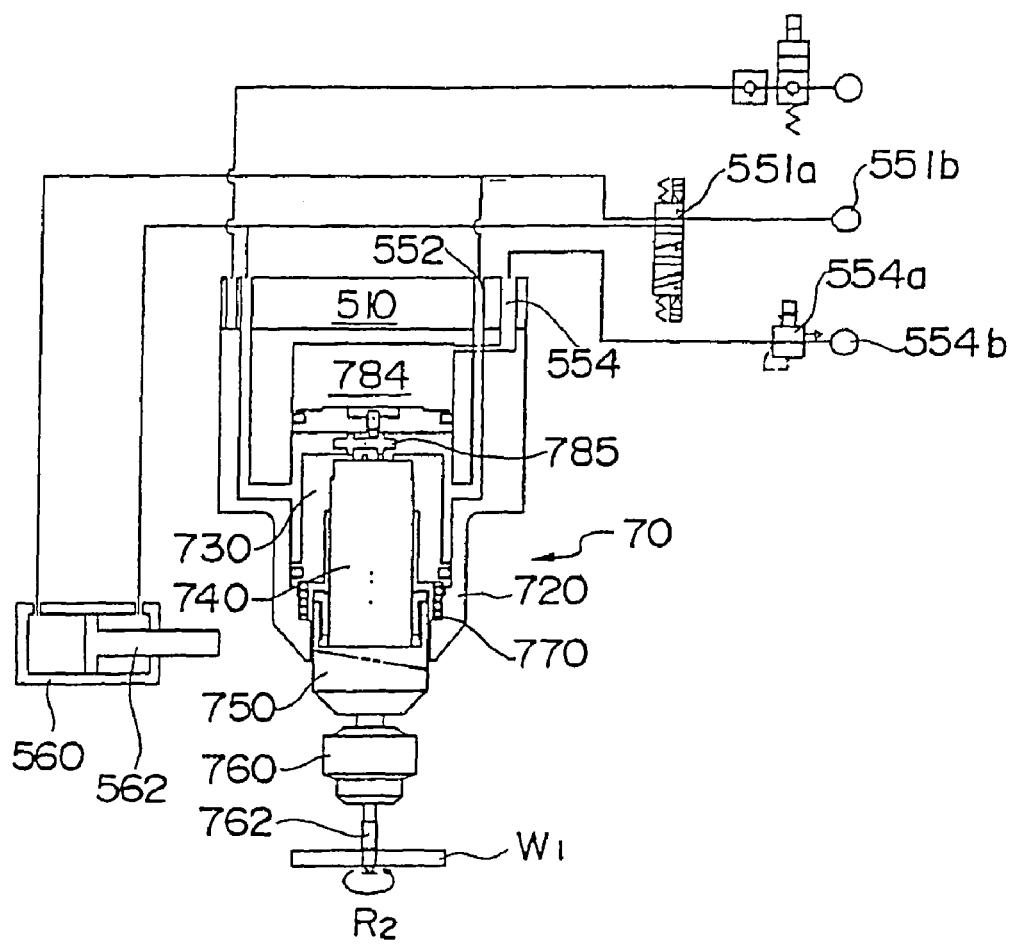
FIG. 20 is a view to illustrate a machining operation by a processing head 50 mounting a machining tool 70.

After the tapping is completed, as shown in FIG. 20, air is supplied to an unclamping circuit 552. The air switches the switching valve 785 to rotate the air motor 740 into a reverse direction $R_2$. The tap 762 rotates in the reverse direction to be out of the work $W_1$. Here, the pressure of the assist gas in the pressurizing chamber 784 is balanced so that no excess thrust is applied to the tap 762.

Figure 21:
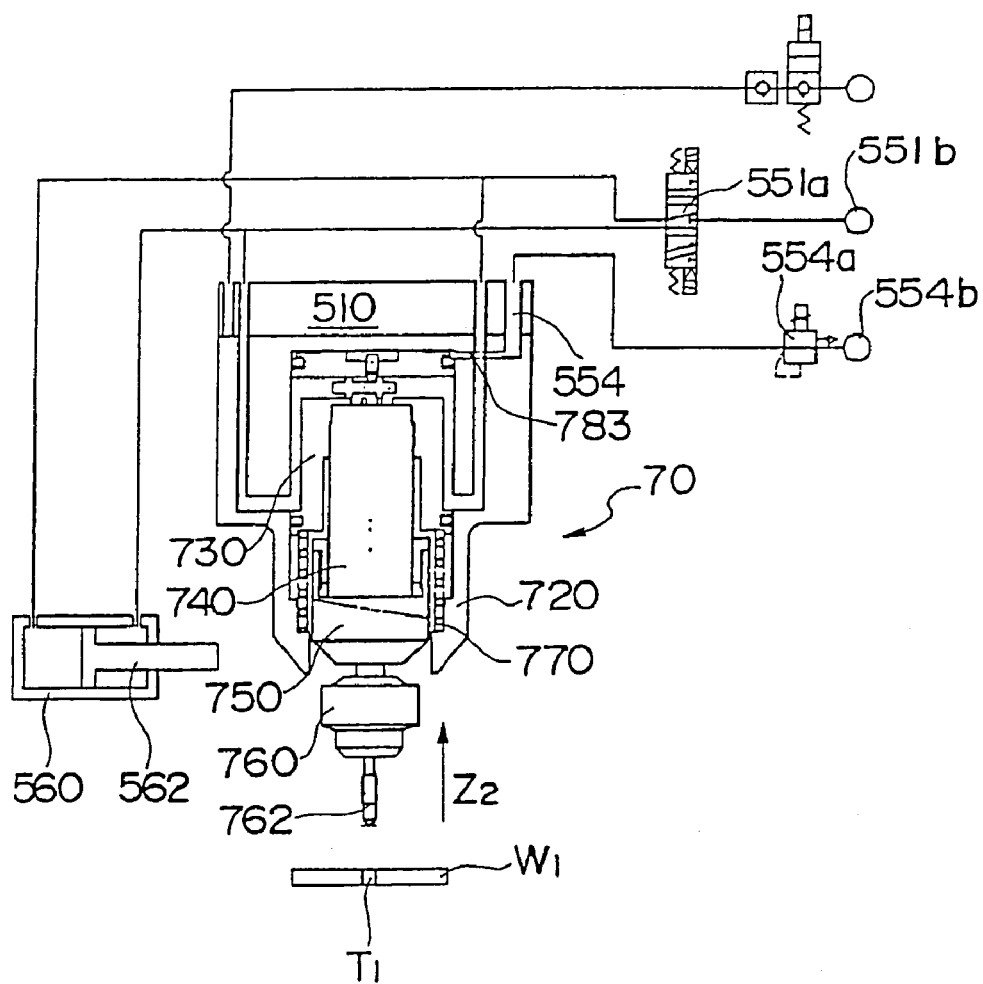
FIG. 21 is a view to illustrate a machining operation by a processing head 50 mounting a machining tool 70.

After the tap 762 is out of the tapped hole $T_1$ of the work $W_1$, as shown in FIG. 21, the assist gas supply to the pressurizing chamber is stopped, and the piston member is raised to the highest position by the action of the spring 770, which returns the tap to the initial state.

Figure 22:
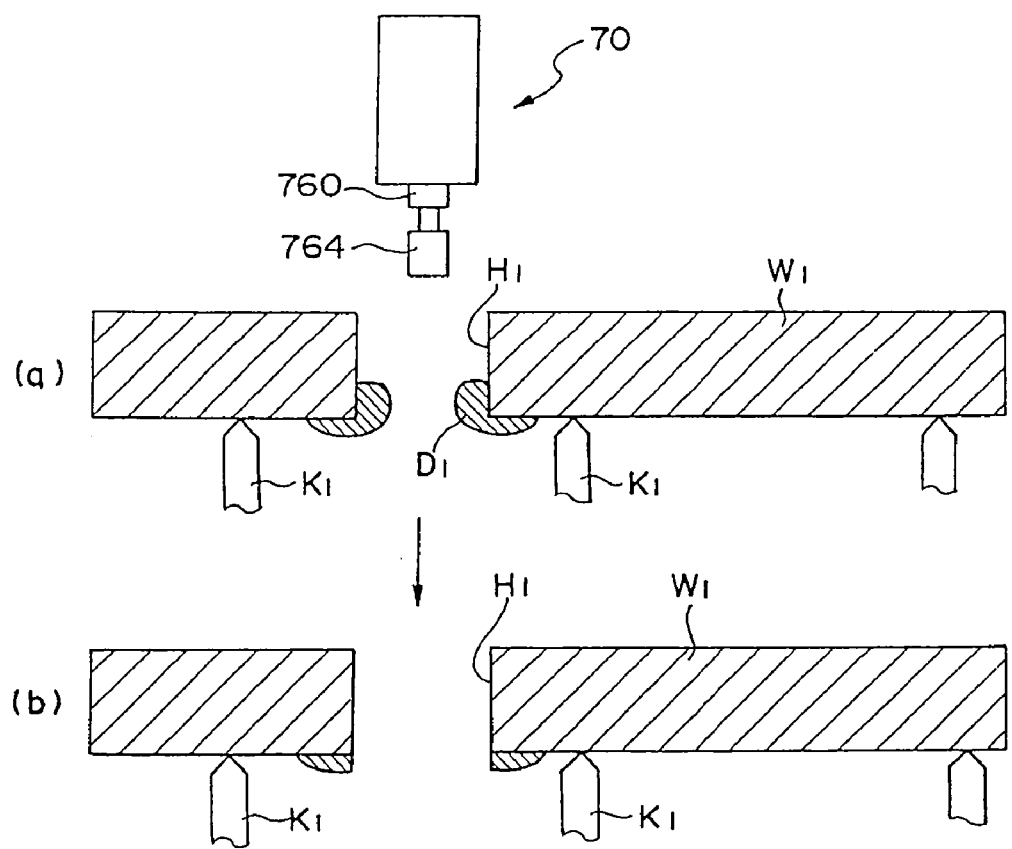
FIG. 22A is a view to illustrate an example of another machining operation according to the present invention.
FIG. 22B is a view to illustrate an example of another machining operation according to the present invention.

FIGS. 22A-22B are the views to illustrate another example according to the present invention. In this example, a tool chuck 760 of a machining tool 70 is equipped with a milling or grinding tool 764 which performs a laser processing for forming a hole $H_1$ in a work $W_1$ supported on a supporting member $K_1$. The dross $D_1$ which is produced in the laser processing adheres to the wall of the hole $H_1$ and solidifies there, which leads a deterioration in the processing accuracy of the hole $H_1$. In this example, the milling or grinding tool 764 cuts or grinds off the dross $D_1$ that adheres to the inside of the hole $H_1$ to improve the processing accuracy of the hole $H_1$.

Figure 23:
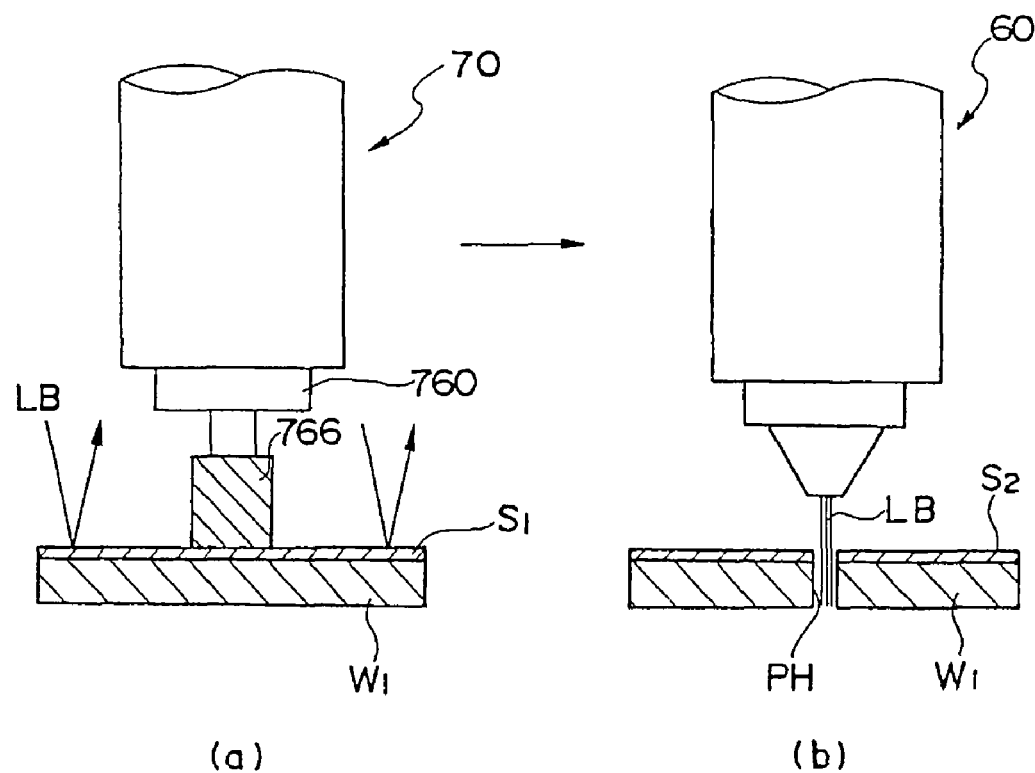
FIG. 23A is a view to illustrate an example of another machining operation according to the present invention.
FIG. 23B is a view to illustrate an example of another machining operation according to the present invention.

FIGS. 23A-23B are the views to illustrate further another example according to the present invention. Some works $W_1$ have mirror finished surfaces $S_1$. In this case, the laser beam LB is reflected at such a mirror surface, which makes it difficult to perform a laser processing on the surface. In the device according to the present invention, a surface roughing tool such as a surface milling or surface grinding tool 766 and the like is equipped to the chuck 760 of the machining tool 70 to perform roughing to increase the roughness of the mirror surface $S_1$. A surface $S_s$ having a high surface roughness has a low degree of reflectance of the laser beam LB, so a processing such as for a piercing hole PH is easily performed, which improves the efficiency of the laser processing.

As described above, the present invention increases the types of processings and improves the efficiency of the processings because a laser processing tool and a machining tool can be automatically exchanged and mounted to a laser processing head to perform a laser processing and machining.

In the above examples, tool change magazines are arranged in a single line in a tool setup station 100 which is displaced at an end of the bed 10. The tool change magazines, however, may be arranged in a plurality of lines or in a matrix at other positions. The tool change magazines may be specially displaced in a plane (for example, the Z axis) which crosses a plane defined by the X axis and the Y axis, in addition to be displaced in the plane defined by the X axis and the Y axis. In addition, it is also possible to place the magazines at appropriate positions where they do not interfere with processing.

Also, in the above examples, a linear motor is used for driving along the X axis and the Y axis. However, the present invention may be applied to a case in which a ball screw is used for driving.

What is claimed is:

1. A laser processing machine, comprising:
   a bed;
   a pallet disposed on the bed to support a work;
   a column which is controlled to move along the X axis, the X axis being the longitudinal axis of the bed;
   a saddle which is supported by the column and is controlled to move along the Y axis, the Y axis being perpendicular to the X axis;
   a processing head which is supported by the saddle and is controlled to move along the Z axis, the Z axis being perpendicular to a plane defined by the X axis and the Y axis;
   a laser processing tool and a machining tool which are exchangeably mounted to the processing head; and
   a tool change magazine for the laser processing tool and the machining tool disposed at an automatic tool change position outside of a processing area,
   wherein the processing head comprises: a clamping device for exchangeably mounting the laser processing tool and the machining tool; and a circuit to send air and assist gas to the laser processing tool and the machining tool.

2. The laser processing machine according to claim 1, wherein the laser processing tool comprises: a body; a rod member which is slidably mounted in the body and has a condenser lens; and a clamping device to fix the rod member to the body.

3. The laser processing machine according to claim 1, wherein the machining tool comprises: a body; a piston member which is slidably mounted in the body; an air motor supported by the piston member; and a tool chuck driven by the air motor.

4. The laser processing machine according to claim 1, wherein the machining tool comprises: a body; a piston member which is slidably mounted in the body; an air motor supported by the piston member; and a tool chuck driven by the air motor; and a tool which is equipped with the tool chuck for drilling, reamering, tapping, hairlining, or grinding.

5. The laser processing machine according to claim 1, wherein the machining tool comprises: a body; a piston member which is slidably mounted in the body; an air motor supported by the piston member; a tool chuck driven by the air motor; and a processing tool which is equipped with the tool chuck for the wall of an opening formed by a laser processing.

6. The laser processing machine according to claim 1, wherein the machining tool comprises: a body; a piston member which is slidably mounted in the body; an air motor supported by the piston member; a tool chuck driven by the air motor; and a tool which is equipped with the tool chuck for roughing a work surface.

7. The laser processing machine according to claim 1, wherein the clamping device comprises: a piston; and a pawl which is operated by the piston for exchangeably clamping and unclamping the laser processing tool and machining tool.

8. The laser processing machine according to claim 7, wherein the piston of the clamping device is in communication with an air flow path; and the pawl of the clamping device exchangeably clamps the laser processing tool and the machining tool by supplying air through the air flow path to the piston so that the pawl of the clamping device engages a pawl of the laser processing tool or a pawl of the machining tool.

9. The laser processing machine according to claim 8, wherein the piston of the clamping device is in communication with a second air flow path; and the pawl of the clamping device exchangeably unclamps the laser processing tool and the machining tool by supplying air through the second air flow path to the piston so that the pawl of the clamping device disengages the pawl of the laser processing tool or the pawl of the machining tool.

* * * * *